United States Patent
Hoffmann et al.

(10) Patent No.: US 7,021,662 B2
(45) Date of Patent: Apr. 4, 2006

(54) SHOULDER BELT HEIGHT ADJUSTER ASSEMBLY AND METHOD

(75) Inventors: Arthur Hoffmann, St. Clair Shores, MI (US); Thomas Drobot, Waterford, MI (US); Artur Dlugosz, Sterling Heights, MI (US); Jeffrey Helner, Livonia, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 177 days.

(21) Appl. No.: 10/631,133

(22) Filed: Jul. 31, 2003

(65) Prior Publication Data

US 2005/0023815 A1    Feb. 3, 2005

(51) Int. Cl.
*B60R 22/20* (2006.01)

(52) U.S. Cl. .................. 280/801.2; 280/804; 297/468; 297/483

(58) Field of Classification Search ............. 280/801.1, 280/801.2, 804; 297/468, 483
See application file for complete search history.

(56) References Cited

U.S. PATENT DOCUMENTS

| | | | | |
|---|---|---|---|---|
| 4,135,737 A * | 1/1979 | Scholz et al. | ............. | 280/801.2 |
| 4,469,352 A * | 9/1984 | Korner et al. | ............ | 280/801.2 |
| 4,522,426 A * | 6/1985 | Weman | .................... | 280/801.2 |
| 4,556,255 A * | 12/1985 | Kawai | ........................ | 297/483 |
| 4,564,219 A * | 1/1986 | Baden et al. | ............ | 280/801.2 |
| 4,652,012 A * | 3/1987 | Biller et al. | ............. | 280/801.2 |
| 4,786,081 A * | 11/1988 | Schmidt | ................... | 280/801.2 |
| 4,818,023 A * | 4/1989 | Griesemer | ................... | 297/483 |
| 5,280,959 A * | 1/1994 | Nanbu | ........................ | 280/808 |
| 5,692,780 A * | 12/1997 | Yasui | ...................... | 280/801.2 |
| 5,758,901 A | 6/1998 | Harenberg | | |
| 5,779,273 A | 7/1998 | Schmidt | | |
| 5,794,977 A * | 8/1998 | Frank | ...................... | 280/801.2 |
| 5,911,439 A | 6/1999 | Pleyer et al. | | |
| 5,924,731 A * | 7/1999 | Sayles et al. | ................ | 280/807 |
| 5,941,566 A | 8/1999 | Holzapfel et al. | | |
| 6,334,629 B1 | 1/2002 | Griesemer et al. | | |
| 6,733,041 B1 * | 5/2004 | Arnold et al. | ............ | 280/801.2 |

* cited by examiner

*Primary Examiner*—Paul N. Dickson
*Assistant Examiner*—Toan C. To
(74) *Attorney, Agent, or Firm*—Ralph E. Smith

(57) ABSTRACT

The invention provides a shoulder belt height adjuster assembly and a method of adjusting the same. The assembly includes a guide rail, a slide, and a biasing member. The guide rail includes a plurality of fixed rail teeth disposed along at least one longitudinal portion. The slide includes an aperture formed therein for slidably receiving the guide rail along the longitudinal portion. The slide further includes a plurality of fixed slide teeth disposed on an interior slide surface. The biasing member is operably attached to the slide aperture for selectively engaging at least one of the fixed slide teeth into at least one of the fixed rail teeth. The engagement prevents slidable movement of the slide relative to the guide rail in a downward direction. The method includes selectively preventing sliding movement of a slide relative to a guide rail, sliding the slide in an upward direction by applying an upward force, and sliding the slide in a downward direction by applying a pressing force and a downward force.

15 Claims, 5 Drawing Sheets

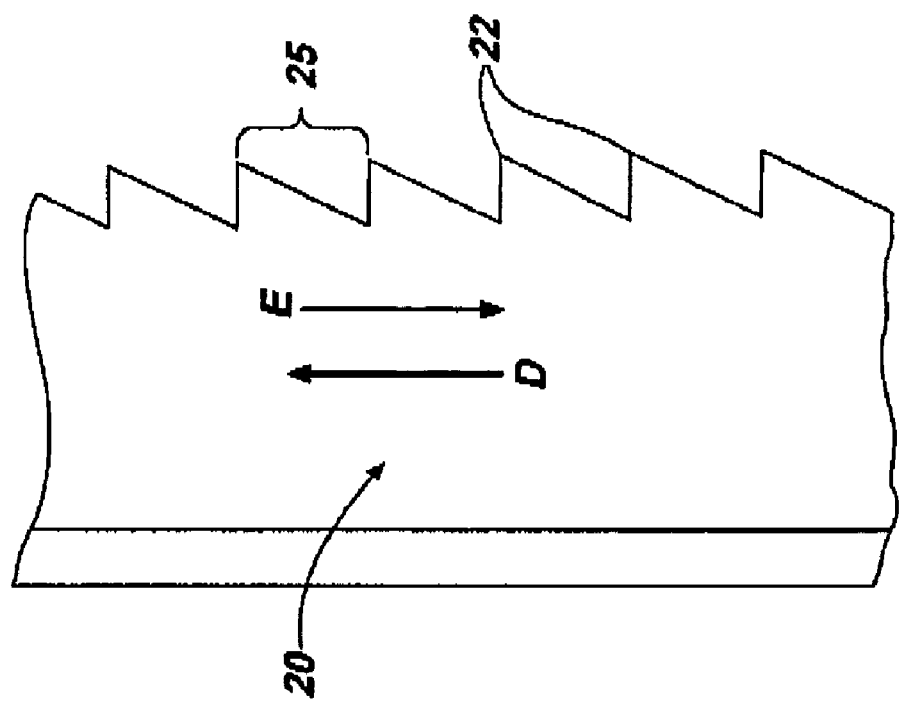
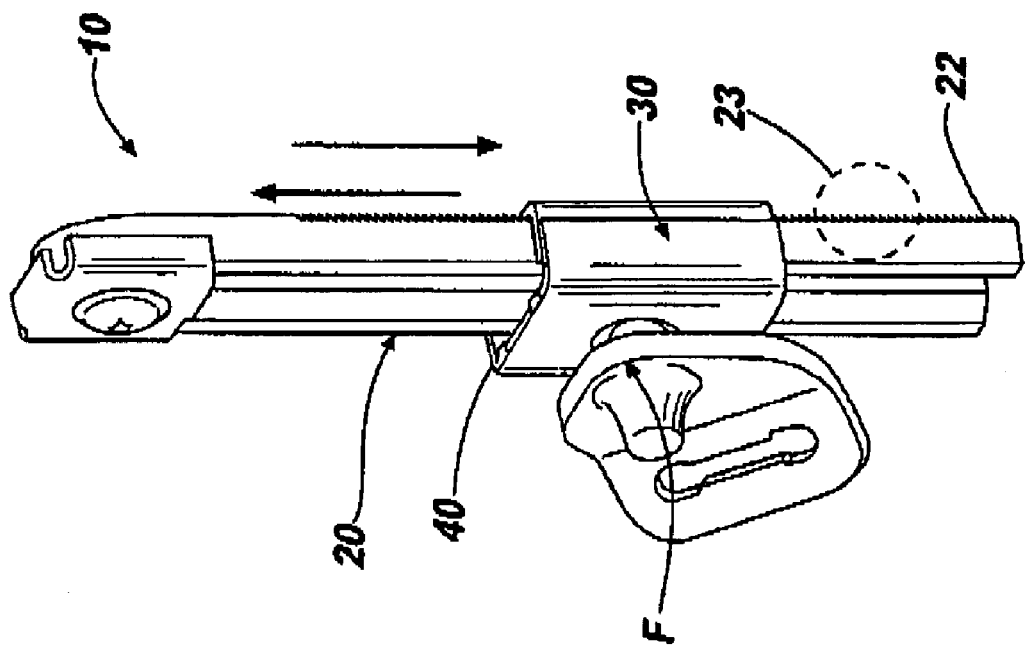

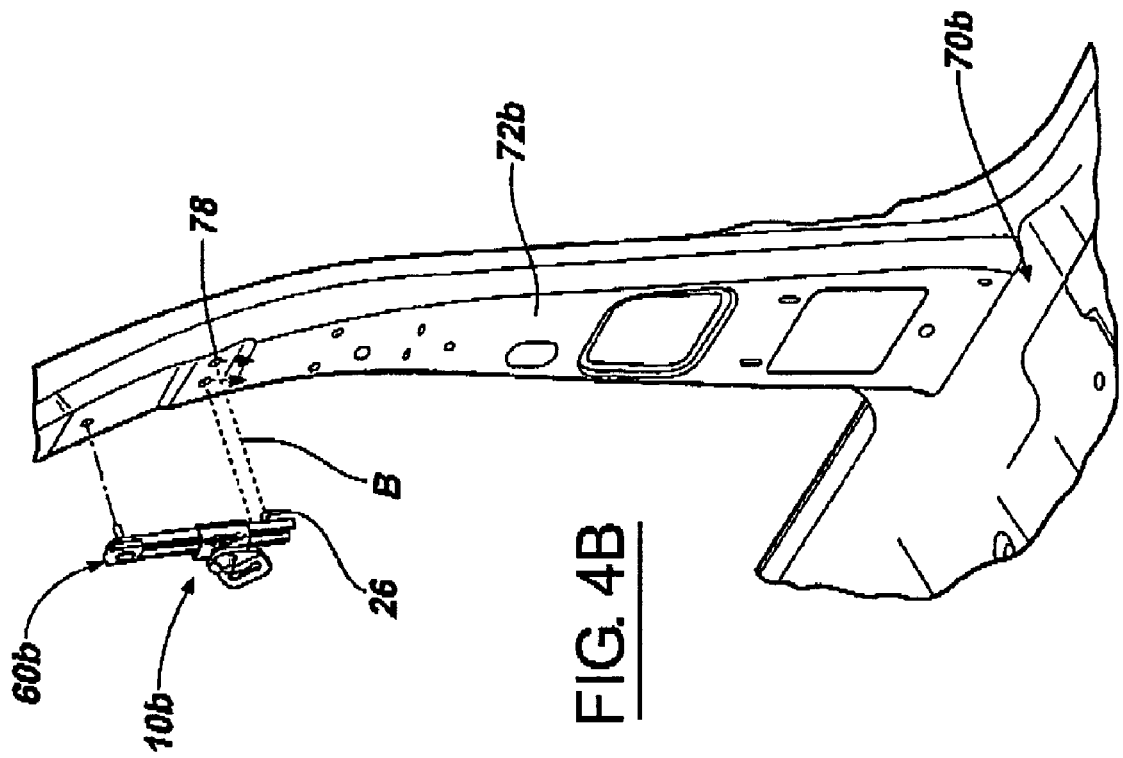
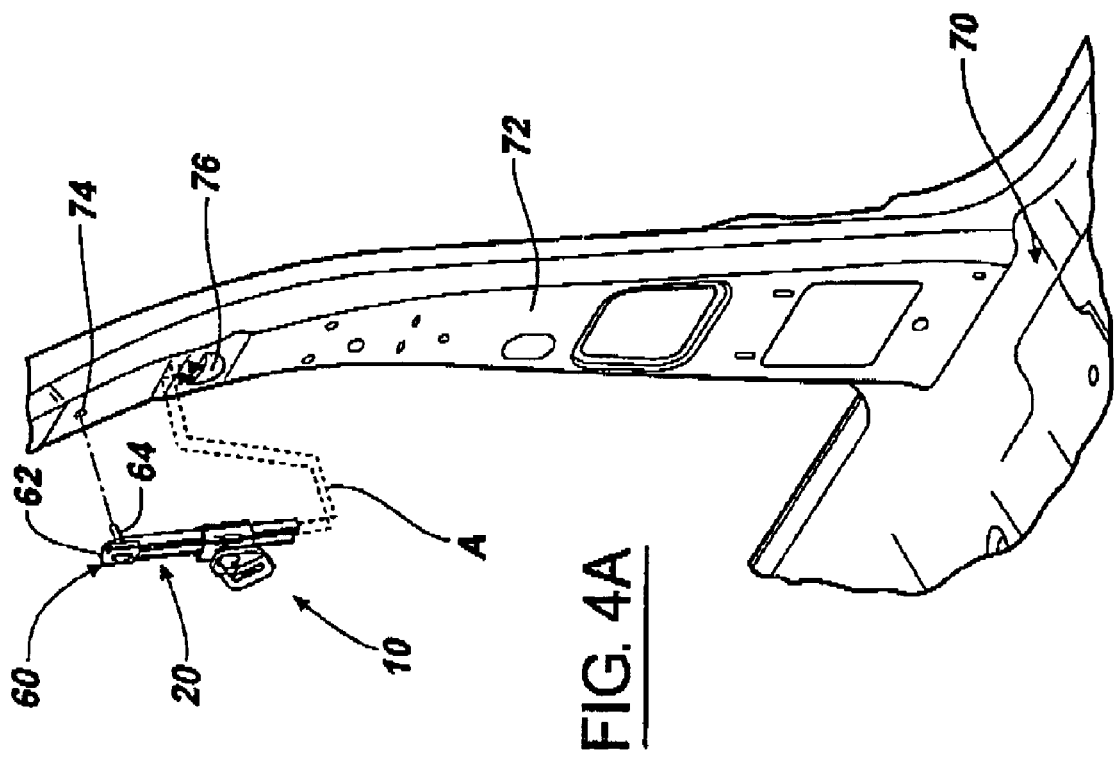

SHOULDER BELT HEIGHT ADJUSTER ASSEMBLY AND METHOD

TECHNICAL FIELD OF THE INVENTION

The present invention relates generally to vehicular restraint systems. More particularly, the invention relates to a shoulder belt height adjuster assembly and method of operating the same.

BACKGROUND OF THE INVENTION

Motor vehicles typically include active restraint systems such as over-the-shoulder safety belts. Such belts are generally attached to a vehicle door pillar at a position slightly above a passenger shoulder. As a passenger's height may vary considerably, it is sometimes desirable to provide a strategy for adjusting the vertical pillar position of the shoulder belt relative to the passenger. Adjustment of the shoulder belt height at the pillar position may offer optimal safety belt operation and ergonomics.

Several strategies developed to provide shoulder belt height adjustment involve the use of a slidable member that moves vertically relative to a guide rail mounted to the vehicle pillar. Examples of such strategies include U.S. Pat. No. 5,758,901 to Harenberg; U.S. Pat. No. 5,911,439 to Pleyer et al.; U.S. Pat. No. 5,941,566 to Holzapfel et al.; and U.S. Pat. No. 6,334,629 to Griesemer et. al., which are incorporated by reference herein. In the Griesemer patent, for example, an adjustment carriage (e.g., the slidable member) includes an arresting mechanism that selectively allows the carriage to engage openings formed in a guide rail. Each engagement opening provides a discrete locking adjustment location. As such, a plurality of discrete locking positions are provided, but the number of height adjustment positions is limited to the number of the openings.

Although such patents disclose strategies that may effectively provide shoulder belt height adjustment, they typically provide a relatively small number of adjustment positions. It is possible to increase the number of engagement openings, however, this may reduce the integrity of the parts and/or increase the complexity and cost of the belt assembly. Accordingly, it would be desirable to provide a larger number of shoulder belt adjustment positions without the need for numerous engagement openings.

Another shoulder belt height adjustment strategy that involves the use of a slidable member moveable within a guide rail includes U.S. Pat. No. 5,779,273 to Schmidt, which is incorporated by reference herein. In the Schmidt patent, an adjusting element (e.g., the slidable member) includes two rotatable gears providing movement relative to a guide rail. In the Schmidt and other patents (e.g., U.S. Pat. No. 5,758,901 to Harenberg and U.S. Pat. No. 5,941,566 to Holzapfel et al.), moveable parts (e.g., gears, levers, etc.) are provided as part of the shoulder belt height adjustment assembly. The use of such auxiliary moveable parts may increase the complexity, cost, and failure rate of the assembly. Accordingly, it would be desirable to provide a shoulder belt height adjustment strategy that does not use auxiliary moveable parts.

Therefore, it would be desirable to provide a shoulder belt height adjuster assembly and method of operation that overcomes the aforementioned and other disadvantages.

SUMMARY OF THE INVENTION

One aspect of the present invention provides a shoulder belt height adjuster assembly. The assembly includes a guide rail, a slide, and a biasing member. The guide rail includes a plurality of fixed rail teeth disposed along at least one longitudinal portion. The slide includes an aperture formed therein for slidably receiving the guide rail along the longitudinal portion. The slide further includes a plurality of fixed slide teeth disposed on an interior slide surface. The biasing member is operably attached to the slide aperture for selectively engaging at least one of the fixed slide teeth into at least one of the fixed rail teeth. The engagement prevents slidable movement of the slide relative to the guide rail in a downward direction.

Another aspect of the invention provides a method of adjusting height of a motor vehicle shoulder belt assembly. The method includes selectively preventing sliding movement of a slide relative to a guide rail, sliding the slide in an upward direction by applying an upward force, and sliding the slide in a downward direction by applying a pressing force and a downward force.

Yet another aspect of the present invention provides a shoulder belt height adjuster assembly. The assembly includes means for selectively preventing sliding movement of a slide relative to a guide rail, means for sliding the slide in an upward direction by applying an upward force, and means for sliding the slide in a downward direction by applying a pressing force and a downward force.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIG. 3A is a perspective view of an assembled shoulder belt height adjuster assembly of FIG. 1;

FIG. 3B is a detailed view of a portion of a guide rail shown in FIG. 3A;

FIGS. 4A and 4B are schematic views of alternative shoulder belt height adjuster assemblies being mounted on vehicle pillars in accordance with the present invention.

DESCRIPTION OF THE PRESENTLY PREFERRED EMBODIMENTS

Figure 1:
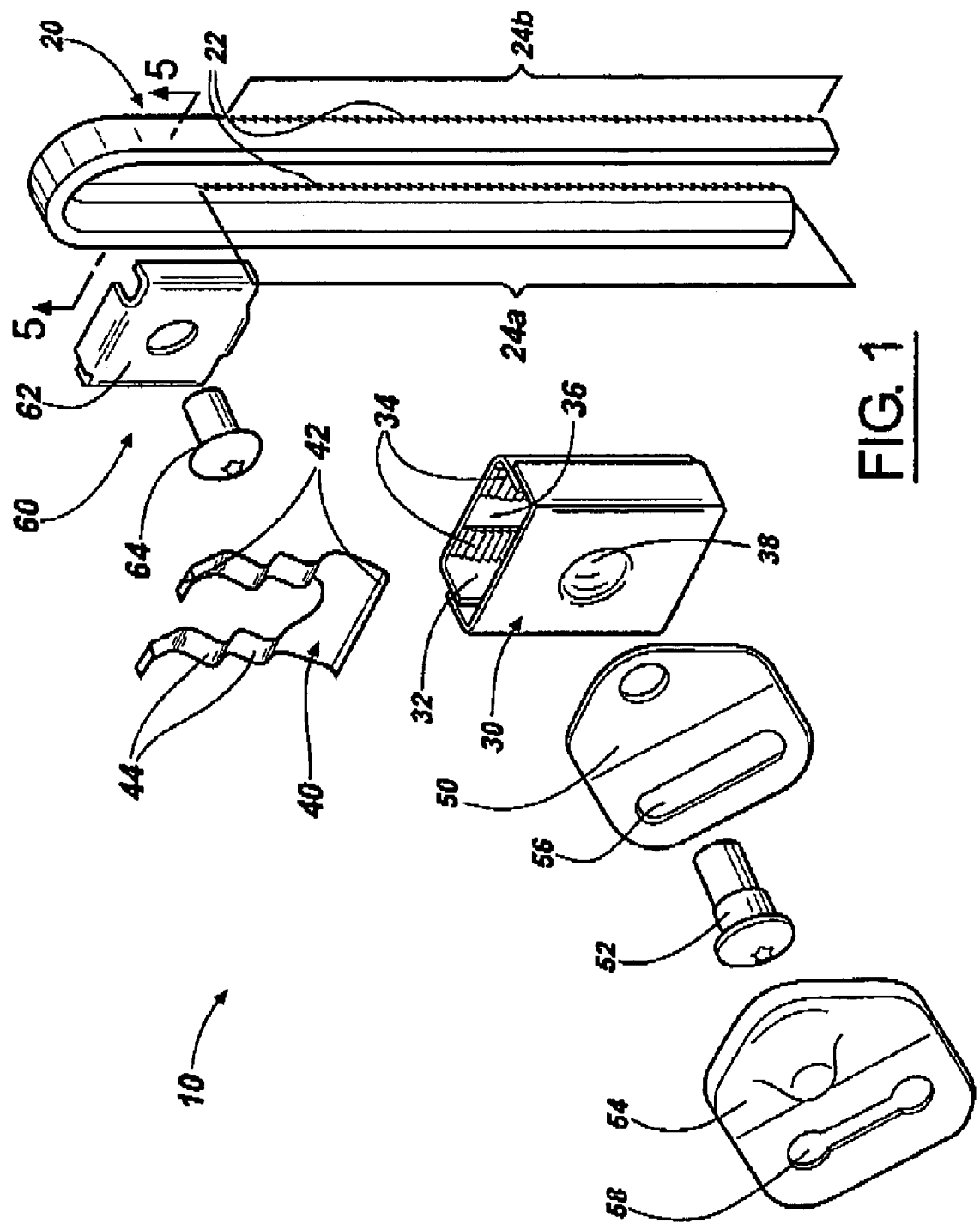
FIG. 1 is an exploded view of a shoulder belt height adjuster assembly in accordance with the present invention for a motor vehicle.

Referring to the drawings, wherein like reference numerals refer to like elements, FIG. 1 an exploded view of a shoulder belt height adjuster assembly in accordance with the present invention, shown generally by numeral 10, for a motor vehicle. Assembly 10 includes a guide rail 20, a slide 30, and a biasing member 40. Guide rail 20 includes a plurality of fixed rail teeth 22 disposed along at least one, in this case two, longitudinal portions 24a, 24b. The slide 30 includes an aperture 32 formed therein for slidably receiving the guide rail 20 along the longitudinal portions 24a, 24b. Slide 30 further includes a plurality of fixed slide teeth 34 disposed on an interior slide surface 36. In the present description, the term "fixed" is meant to describe gear-like teeth structures that are not moveable relative to an underlying surface. For example, the fixed slide teeth 34 are not moveable (e.g. rotatable, slidable, etc.) relative to the interior slide surface 36.

As shown in FIGS. 5A–5D, in one embodiment, the guide rail 20 may be formed from a single piece that is substantially U-shaped and may have a cross-sectional shape that is square, rectangular, oval, or circular. Referring again to FIG. 1, guide rail 20 maybe manufactured from a sufficiently rigid material such as steel, metal, metal alloy, composite, and the like. Guide rail 20 may be formed, for example, by bending an elongated bar piece into the U-shape. Fixed rail teeth 22 may be formed on the guide rail 20 by, for example, a broaching process. Those skilled in the art will recognize that the guide rail 20 geometry, material, fixed rail teeth 22, and method of manufacturing the same may vary without limiting the function of the present invention.

In one embodiment, the biasing member 40 may be shaped to provide a biasing force within the slide aperture 32. Biasing member 40 may be substantially U-shaped to "fit" around a threaded slide channel 38. Furthermore, clip ends 42 may be provided to attach (e.g., "clip") the biasing member 40 to the slide 30. The biasing member 40 may include at least one, and in this case four, bend formations 44. Biasing member 40 is typically manufactured from a relatively elastic material thus allowing the bend formations 44 to naturally maintain their shape. As such, lateral compression of the bend formations 44 provides the biasing force that selectively engages the fixed slide teeth 34 into the fixed rail teeth 22. Those skilled in the art will recognize that the biasing member 40 geometry, material, and bend formations 42 may vary while still providing the biasing force.

Assembly 10 may include a D-ring 50 for operably attaching the slide 30 to a shoulder belt (not shown). In one embodiment, the D-ring 50 may be attached to the slide 30 with a threaded D-ring bolt 52 received within the threaded slide channel 38. A D-ring cover 54 may be provided to cover the D-ring 50 and D-ring bolt 52. The shoulder belt may be positioned through openings 56, 58 formed in the D-ring 50 and D-ring cover 54, respectively. D-ring bolt 52 may provide a swivel attachment of the D-ring 50 and D-ring cover 52 thereby allowing a swivel motion of the shoulder belt.

Assembly 10 may further include at least one mount 60 for operable attachment to the motor vehicle. Numerous mount designs may be used to operably attach the assembly 10 to the vehicle and include, but are not limited to, bolt mounts, hook mounts, pocket mounts, and the like. The number, position, and design of the mounts may vary based on the design of the assembly 10 and/or the motor vehicle.

In one embodiment, which is also shown FIG. 4A, a bolt mount 60 may be positioned near the guide rail 20 U-bend. Bolt mount 60 may include a bracket 62 and a threaded bolt 64, which is received in a threaded opening 74 formed in a vehicle pillar 72. This provides a first point of attachment. A second point of attachment is provided by inserting the guide rail 20 (see arrows A) into a pocket mount 76. Pocket mount 76 is attached to the vehicle pillar 72 and includes opening(s) to receive ends of the guide rail 20. As such, the bolt mount 60 and pocket mount 76 provide means of attaching the assembly 10 to a vehicle 70.

In another embodiment, which is shown FIG. 4B, a bolt mount 60b may provide a first point of attachment. A second point of attachment may be provided by inserting one or more guide rail hooks 26 (see arrows B) into corresponding openings 78 formed in the vehicle pillar 72b. As such, the bolt mount 60b and guide rail hooks 26 provide means of attaching an assembly 10b to a vehicle 70b. It should be recognized that numerous strategies exist for attaching the shoulder belt height adjuster assembly to the vehicle and that the present invention is not limited to the aforementioned examples.

Figure 2:
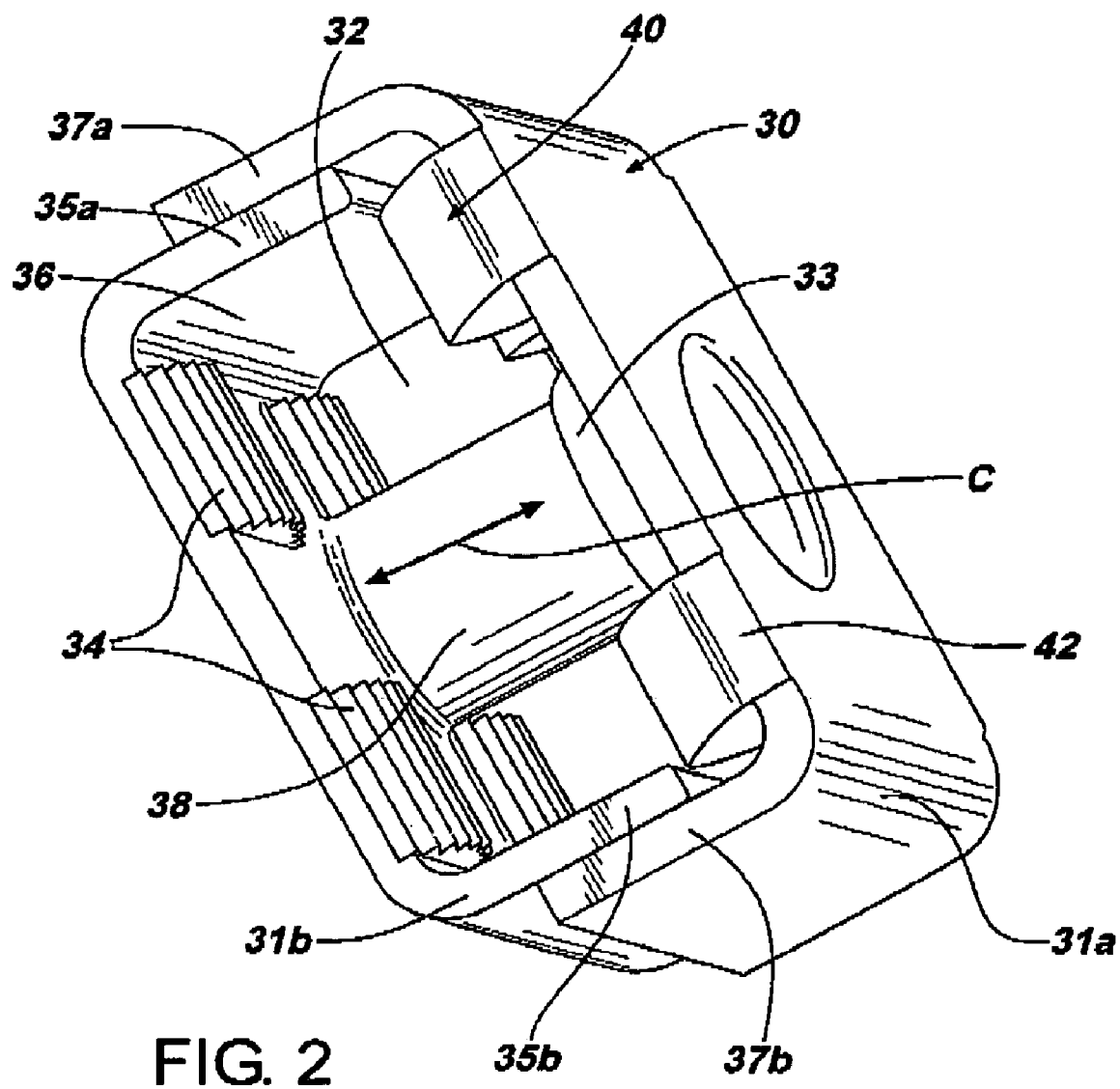
FIG. 2 is a perspective view of a slide and attached biasing member of the assembly shown in FIG. 1.
Figure 5A:
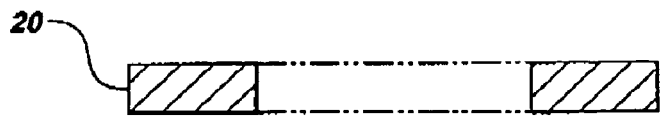
FIGS. 5A, 5B, 5C AND 5D are sectional views taken across line 5—5 of FIG. 1 showing alternative cross-sectional structures of a guide rail shown in FIG. 1.
Figure 5B:
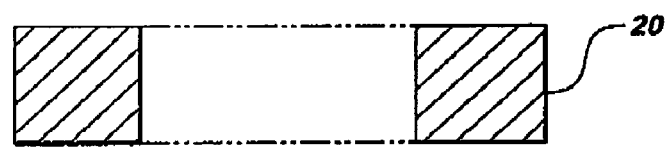
Figure 5C:
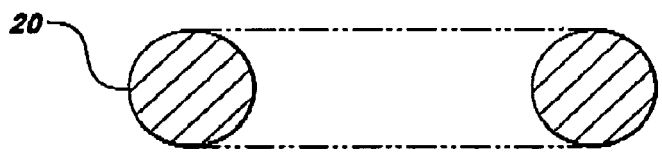
Figure 5D:
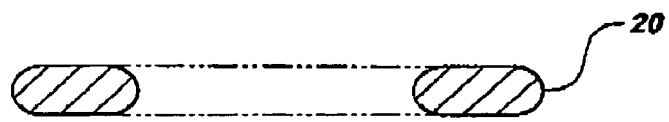

Turning now to FIG. 2, a perspective view of the slide 30 and attached biasing member 40 is shown. Fixed slide teeth 34 may have a rounded configuration and formed in the interior slide surface 36 by a variety of methods including, but not limited to, stamping, broaching, casting, and forging. Biasing member 40 may be received within the slide aperture 32 and is shown positioned therein with attached clip ends 42. Slide 30 may include two slide portions 31a, 31b slidably received one to another thereby providing a range of motion (as shown by arrows C). Specifically, slide portion 31b flanges 35a, 35b may be slidably received within slide portion 31a flanges 37a, 37b. Furthermore, the threaded slide channel 38, which may be integral to slide portion 31b, may be slidably received by an opening 33 formed in slide portion 31a. The opening 33, threaded slide channel 38, and/or flanges 35a, 35b, 37a, 37b may include means known to one skilled in the art to prevent the two slide portions 31a, 31b from separating.

Referring now to FIG. 3A, the shoulder belt height adjuster assembly 10 is shown assembled. During operation of the assembly 10, sliding movement of the slide 30 relative to a guide rail 20 is selectively prevented. This may be achieved by selectively engaging the fixed slide teeth into fixed rail teeth 22. The biasing member 40 provides the biasing force that biases the fixed slide teeth into the fixed rail teeth 22. In its default position, the assembly 10 fixed slide teeth are engaged into the fixed rail teeth 22 thereby setting the height. This set height typically does not change without further manipulation (e.g., adjustment by a vehicle passenger). The fixed rail teeth 22 provide numerous discrete slide 30 adjustment positions, without the need for numerous openings in the guide rail 20. Therefore, the assembly 10 may advantageously provide more shoulder belt height adjustment positions over the prior art.

The assembly 10 height may be adjusted by sliding the slide 30 in an upward direction (as indicated by arrow D). The upward adjustment is achieved by applying an upward force (e.g., in direction of arrow D) to the slide 30. In one embodiment, as the upward force is applied, the slide 30 may ratchet to the guide rail 20 in the upward direction thereby incrementally setting new height positions. A detailed view of a portion 23 of the guide rail 20 is shown in FIG. 3B. Fixed rail teeth 22 may have a saw-tooth configuration 25. The configuration 25 provides means for ratcheting the slide wherein it is free to move in the upward direction D, however, movement in a downward direction (as indicated by arrow E) is not permitted. Referring again to FIG. 3A, the slide 30 may be adjusted in the upward direction D until the upward force is released or until the slide 30 reaches an upper limit in its range of motion.

The assembly 10 height may also be adjusted by sliding the slide 30 in the downward direction E. The downward adjustment is achieved by applying to the slide 30 a pressing force (e.g., in direction of arrow F) and a downward force (e.g., in direction of arrow E). In one embodiment, slidable movement of the slide 30 in the downward direction E is prevented by the engagement of the fixed slide teeth into the fixed rail teeth 22. Application of the pressing force, however, releases the biasing force and thereby disengages the fixed slide teeth from the fixed rail teeth 22. As such, the slide 30 is free to slide in the downward direction E provided that the downward force is simultaneously applied. Given that the slide 30 and attached components have mass, the downward force may be sufficiently provided by gravity alone. Alternatively, the downward force may be provided by a vehicle passenger, electric motor, or other means. Slide 30 may be adjusted in the downward direction E until the pressing force and/or the downward force is/are released or until the slide 30 reaches a lower limit in its range of motion.

Assembly 10 may further include features to provide the upper and lower limits of the slide 30 range of motion. For example, the slide 30 motion may be limited by physical contact with the mount(s), reaching a sliding point where the fixed slide teeth can no longer engage the fixed rail teeth 22, providing flanges (not shown) in the guide rail 20, or by other means.

It is important to note that the "upward" and "downward" directions presently used are relative and are provided to merely illustrate the operation of the shoulder belt height assembly while mounted in a vehicle. The upward and downward directions discussed herein are meant to describe any two directions that are roughly 180 degrees one to another. Those skilled in the art will recognize that the height adjustment and applied force directions may vary and that the present invention is not limited to the present embodiments.

While the embodiments of the invention disclosed herein are presently considered to be preferred, various changes and modifications can be made without departing from the spirit and scope of the invention. For example, the shoulder belt height assembly, and the method of operation are not limited to any particular design or sequence. For example, the slide, guide rail, and biasing member geometry, size and length, material constitution, relative position, and fixed teeth configuration may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

The invention claimed is:

1. A shoulder belt height adjuster assembly for a motor vehicle, the assembly comprising:
   a guide rail including a plurality of fixed rail teeth disposed along at least one longitudinal portion, wherein the guide rail comprises a single piece that is substantially U-shaped;
   a slide including an aperture formed therein for slidably receiving the guide rail along the longitudinal portion, the slide including a plurality of fixed slide teeth disposed on an interior slide surface; and
   a biasing member operably attached to the slide aperture for selectively engaging at least one of the fixed slide teeth into at least one of the fixed rail teeth; wherein said engagement prevents slidable movement of the slide relative to the guide rail in a downward direction.

2. The assembly of claim 1 wherein the guide rail comprises a cross-sectional shape selected from a group consisting of a square, a rectangle, an oval, and a circle.

3. The assembly of claim 1 wherein the biasing member comprises at least one bend formation.

4. The assembly of claim 1 wherein the biasing member is positioned substantially within the slide aperture.

5. The assembly of claim 1 wherein the fixed rail teeth comprise a saw-tooth configuration.

6. The assembly of claim 1 further comprising:
   at least one mount for operably attaching the assembly to the motor vehicle; and
   a D-ring operably attached to the slide and to a shoulder belt.

7. The assembly of claim 6 wherein the mount comprises a bolt mount.

8. The assembly of claim 6 wherein the mount comprises a hook mount.

9. The assembly of claim 6 wherein the mount comprises a pocket mount.

10. The assembly of claim 6 wherein the D-ring is swivel attached to the slide with a D-ring bolt.

11. A shoulder belt height adjuster assembly for a motor vehicle, the assembly comprising:
    a guide rail including a plurality of fixed rail teeth disposed along at least one longitudinal portion;
    a slide including an aperture formed therein for slidably receiving the guide rail along the longitudinal portion, the slide including a plurality of fixed slide teeth disposed on an interior slide surface, wherein the fixed slide teeth comprise a rounded configuration; and
    a biasing member operably attached to the slide aperture for selectively engaging at least one of the fixed slide teeth into at least one of the fixed rail teeth; wherein said engagement prevents slidable movement of the slide relative to the guide rail in a downward direction.

12. The assembly of claim 11 wherein the biasing member comprises at least one bend formation.

13. The assembly of claim 11 wherein the biasing member is positioned substantially within the slider aperture.

14. The assembly of claim 11 further comprising:
    at least one mount for operable attaching the assembly to the motor vehicle; and
    a D-ring operably attached to the slide and to a shoulder belt.

15. The assembly of claim 14 wherein the D-ring is swivel attached to the slide with a D-ring bolt.

* * * * *